W. SELLERS.
Turn-Tables for Railroads.
No. 5,373. Reissued April 22, 1873.
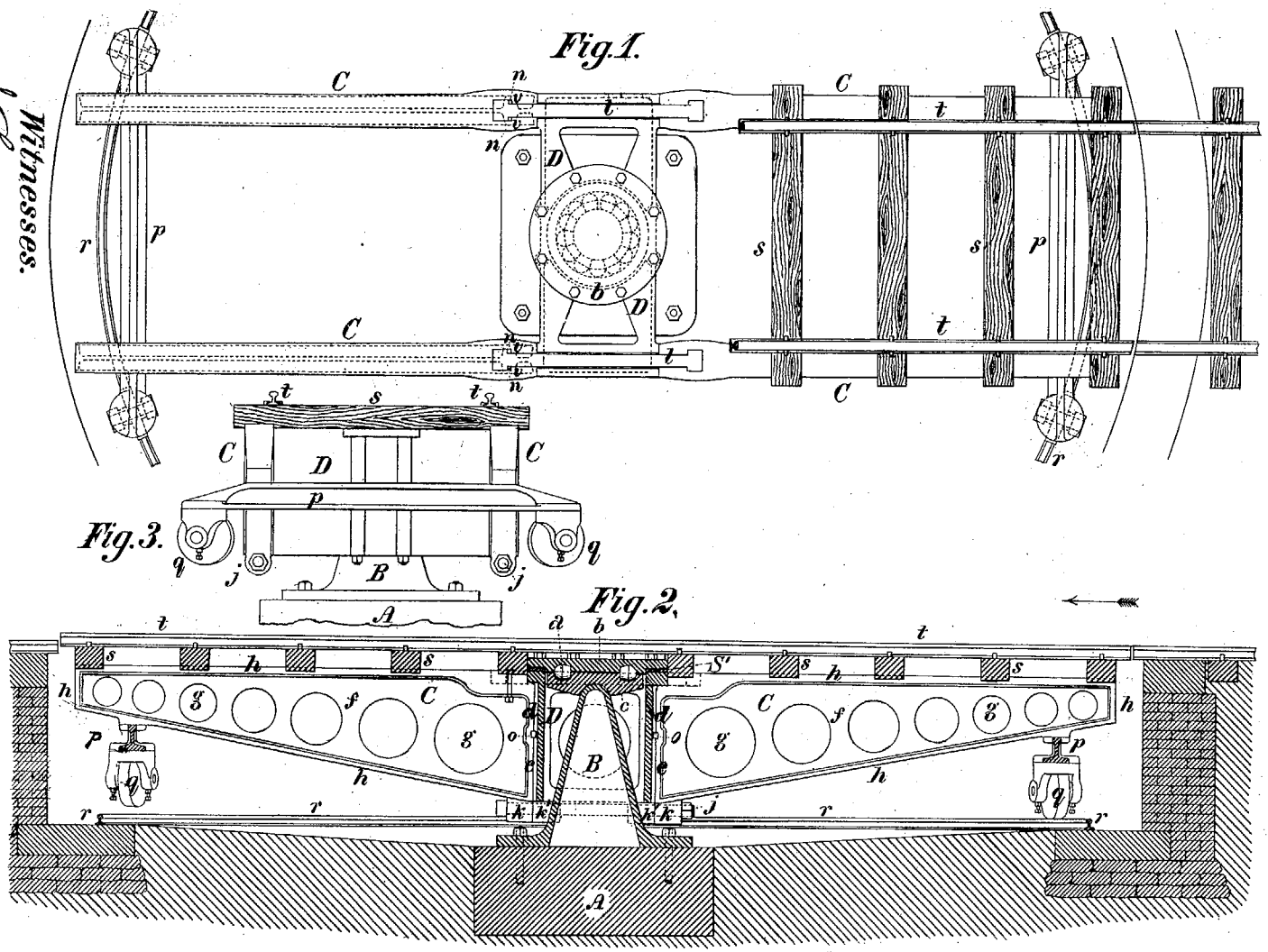
*Witnesses.*
J. Snowden Bell.
Wm. E. Morgan.
Wm. Sellers
THE NORRIS PETERS CO., PHOTO-LITHO., WASHINGTON, D. C.

UNITED STATES PATENT OFFICE.

WILLIAM SELLERS, OF PHILADELPHIA, PENNSYLVANIA.

IMPROVEMENT IN TURN-TABLES FOR RAILROADS.

Specification forming part of Letters Patent No. 19,717, dated March 23, 1858; reissue No. 582, dated August 10, 1858; extended seven years; reissue No. 5,373, dated April 22, 1873; application filed March 15, 1873.

*To all whom it may concern:*

Be it known that I, WILLIAM SELLERS, of Philadelphia, in the State of Pennsylvania, have invented certain new and useful Improvements in the Construction of Turn-Tables for Railroads, of which improvement the following is a full, clear, and exact description and specification:

In order that a turn-table with its load may revolve with the greatest ease it is necessary that the whole of the weight should be borne by the center bearing, so that the load may be balanced and leave the beams which sustain the load as it passes on to the table clear of all support, when the table is turning, except from the central part, the outer track-wheels merely touching for the moment the rail provided for their travel in case of the tipping of the table upon the central bearing. These results have not been and apparently cannot be permanently attained with wood, for the reason that the bearing-surfaces of a wooden frame are easily crushed by the strains to which they are subjected, and wood is liable to decay. On the other hand wrought-iron is too expensive.

To make a cast-iron turn-table of such lengths and strength as would meet these requirements, without involving excessive weight and great cost of transportation and handling during erection, and great liability to fracture during transportation and erection, required the invention of some new methods of construction. Such methods constitute my invention, which consists of the following combinations and arrangements, constituting improvements more or less of which may be used as constructors of turn-tables may deem expedient.

The first of said combinations is composed of five principal parts—that is to say, a central box having parallel faces on opposite sides so that these faces may be readily planed in a machine, and four projecting beams, which sustain the rails. These five parts are so arranged and combined that the four beams are rigidly connected at their inner extremities with the central box, are arranged in two parallel lines, and project from the said box at or about the corners thereof in parallel lines corresponding substantially with the lines of the rails of the track. This construction enables me to produce a turn-table, in which, even for the largest sizes, none of the parts need be heavier or of greater dimensions than will admit of easy handling and transportation, while the parts, when put together, constitute a frame that is rigid, secure, and durable.

The next improvement consists of a peculiar combination and arrangement of the central box and beams, viz., the combination of four beams, arranged in two parallel lines with the central box, in such manner that portions of the said box are interposed between portions of said beams, having surfaces which are in directions transverse of the lengths of the beams, so that the endwise crushing strains upon said beams are in part or in whole transmitted to the central box through the said transverse surfaces.

The next improvement consists of the combination of the four beams which support the track, and are arranged in two parallel lines, the central box, two cross-girts, and track-wheels adapted to run upon a circular track concentric with the turning axis of the central box in such manner that the inner extremities of the beams are connected crosswise by the central box, while their outer extremities are connected crosswise by the two cross-girts, and the track-wheels are arranged at or near the outer ends of the beams, so that the connected outer ends of the beams may be supported directly while the locomotive runs upon the turn-table.

The next improvement consists of the combination of the beams lengthwise at their inner ends by means of a peculiar system of fastenings composed of links (or their equivalents for resisting longitudinal strains) and wedge-formed keys, which may be driven up so as to render the connection by the links rigid, and which may also be readily driven out so as to release the links, (or their equivalents.) This system of fastening permits the parts of the turn-table to be set up and rigidly secured to the central box by ordinary laborers, and also to be readily disconnected for removal to a new locality.

The next improvement consists of the combination of the central box and the pedestal upon which the said box is supported, by means of a socket-plate, (constructed to tip upon the head of the pedestal,) a cap-plate which surmounts the said socket-plate, and suspending-bolts which connect the said box with the cap-plate, the whole operating in such manner that the central box (and the parts which it sustains) may be adjusted vertically as required.

My invention further consists of the combination of the central box and the cap-plate (from which the said box is suspended) with a socket-plate which rests upon the central pedestal, and with anti-friction rollers interposed between the said two plates, so that the turning of the table is facilitated by the said rollers, and the strain of the weight is distributed upon all of them when the table is tipped.

In order that my invention may be fully understood, I have represented in the accompanying drawing and will proceed to describe a turn-table embodying all my improvements in the best form known to me at the date of my application for the original patent.

Figure 1 of said drawing is a plan of the turn-table frame, constructed of cast-iron. Fig. 2 is a longitudinal vertical section of the turn-table, showing its location in its pit, and its position relatively to the rails of the road, when the load is passing onto the table, in the direction of the arrow. Fig. 3 is an end elevation of the table.

In order to sustain the turn-table a firm base, A, is located centrally in the pit in which the table is placed, and upon this base is properly secured a conical pedestal, B, the upper extremity of which is hemispherical, and forms the pivot upon which the frame may be tipped. Resting upon this hemispherical end of the pedestal B is the socket-plate *c*, provided at its under side with a concavity that fits loosely upon the top of the post B, (the plate and post thus forming a ball-and-socket bearing.) At the upper side of the socket-plate is a groove suitably formed to receive the rollers *a*. Resting upon these rollers is the cap-plate *b*, provided also with a groove similar to that in the plate *c*. From this plate *b* the central box D of the table is suspended by screw-bolts so that the table shall turn freely upon the interposed rollers *a*, while it can tip upon the pedestal B. The screw-bolts afford a ready means by which the vertical adjustment of the table may be effected with reference to the lines of rail on the track of the road. The frame of the turning-table is composed mainly of the central part or box D and four beams, C C C C. The central box D is quadrangular in form, and is by preference cast in a single piece. It is also hollow, with an opening at its bottom to admit the post B, and has an opening at its top to admit the plate *c*. The cap-plate *b* extends over the upper opening in this central box, and the bolts which suspend the box from the plate *b* pass through the upper plate or flange of this box, as well as through its two sides. By referring to Figs. 1 and 3 it will be seen that there are in this instance eight bolts, four of which pass down through the sides and bottom of the box and four only through the upper flange of the box. Between the upper plate of the central box D and the cap-plate *b* there is interposed a lamina, S′, of wood, the thickness of which can be varied to maintain the cap-plate at the required distance from the top of the central box when the level of the table relatively to the track of the road is adjusted. The central box D, thus suspended upon the post B, has four faces, *d d d d*, two on each side. These faces project but slightly from the faces of the box D, and their surfaces are made parallel and accurate by planing. To each one of these faces is fitted the inner extremity *e* of one of the four beams C. These beams are cast each in one piece, and each of a thin plate, *f*, tapering from the inner end *e* to the outer end, with holes *g* to reduce the weight and with a flange-like border, *h*, all around on both sides to give the required strength laterally as well as to resist the tensile and crushing forces to which the beams are exposed when locomotives pass over or rest upon them. The inner extremity *e* of each truss-beam is properly faced in directions transverse of its length to fit against one of the faces *d* of the central part or box, and the four beams, when properly secured to the box, form two parallel lines corresponding to the diameter of the table and the width of the track, so that the cross-ties for the rails can be applied thereto, substantially as on the bed of the road. The beams are firmly secured at their inner extremities in pairs to the central box at bottom by two strong screw-bolts, *j j*, which extend from one beam to the other and pass through holes in projecting ears, one, *k*, on each beam and two, *k′*, on the central box. Moreover, the beams of each pair are secured together at the top by a double-headed T-link and keys, each link extending from one beam to the other at the same side of the central pedestal and being let into conformably-shaped grooves or recesses in the upper surface of the beams and central box. After each link *l* has been inserted in its grooves the connection is made solid by means of keys *n n* driven in between the heads of the links and the shoulders *v v* upon the beams. The upper surfaces of the beams and of the central box are prevented from moving relatively to each other in a vertical direction by keys *o o* inserted in cross-grooves made partly in the faces *d d d d* of the central box and partly in the faces of the inner ends of the beams. At each end of this turn-table frame, near the outer extremities of the two beams, a cross-girt, *p*, is secured to the respective ends of the beams so as to connect them cross-wise; and the ends of the two girts *p p* are provided with wheels *q q*, which run on a circular rail, *r*, or track in the pit, the axes of these track-wheels being radial to the axis of rotation of the table.

Wooden cross-ties *s*, with their under surfaces notched out, are laid across and let down onto the upper face of the beams C C C C, and on these cross-ties are then properly secured the rails *t t*, as also the flooring, to constitute a complete turn-table.

From the foregoing it will be seen that, by reason of the construction of the turn-table frame of a central box and the four beams, these pieces may be readily made of cast-iron and may all be readily, accurately, and firmly fitted to each other; and a turn-table can be produced at comparatively little cost and without the restrictions as to size or diameter by which turn-tables of cast-iron had, prior to my invention, been practically limited. Moreover, as the surfaces of the ends of the beams are transverse of their length, and abut against portions of the central box, the said surfaces of parts of the beams constitute transverse bearing-surfaces between which portions of the central box are interposed, and consequently the endwise crushing strains to which the beams are subjected are propagated, in whole or in part, through the said transverse bearing-surfaces to the said box.

In addition to the above advantages, the said five parts, from the method of connecting them by links and keys, can be readily disconnected and put together again, and rigidly secured to each other without requiring skilled labor; and the entire weight of the table and its load can be supported solely upon the central pedestal, thereby reducing the friction in turning to the minimum.

The level of the rails on the table should be slightly above the level of the rails on the main track, and to a corresponding extent, the track-wheels *q* at the outer extremities of the beams, should be above the circular rail *r*, so that when a locomotive runs onto the rails of the table, they will be brought down to the level of the rails of the main track, and there sustained by the track-wheels *q* and rail *r* until the locomotive is brought to the required position to balance on the central pedestal B, when the sustaining track-wheels will be relieved from the rail *r*, and the table will be free to revolve upon the central rollers *a*.

The table is free to revolve upon the hemispherical top of the post B; but when friction-rollers are used, and are properly constructed, the table will merely tip upon the post and turn upon the rollers. The provision for tipping is important, not only to permit the tipping of the table, but also to distribute the weight upon all the rollers, as the socket-plate is thereby permitted to adapt itself to the change of the position of the cap-plate in tipping, so that no destructive load can be brought upon any one roller, as would be the case but for the employment of the ball-and-socket bearing, or some equivalent for it.

Having thus described the nature and objects of my invention, and having given an exemplification of its embodiment in a practical form, what I claim as new, and desire to secure by Letters Patent, is—

1. The combination of a central box with four beams, which are rigidly secured at their inner extremities to the said box, and project from the corners thereof in parallel lines.

2. The combination of the beams in two parallel lines with the central box, in such a manner that portions of the box are interposed between transverse bearing-surfaces of the beams.

3. The combination of four beams, a central box, two cross-girts, and track-wheels, in such manner that the beams are connected at their inner extremities in two parallel lines by the box, and at their outer extremities by the cross-girts, and that the track-wheels are arranged near the outer ends of said beams.

4. The combination of the beams, the links, and the keys, substantially as before set forth.

5. The combination of the central box, the cap-plate, the socket-plate, the suspending adjusting-bolts, and the central pedestal, substantially as before set forth.

6. The combination of the central box, the cap-plate, the socket-plate, the anti-friction rollers, and the central pedestal, substantially as before set forth.

WM. SELLERS.

Witnesses:
WM. E. MORGAN,
J. SNOWDEN BELL.